United States Patent
Kerns et al.

(10) Patent No.: US 7,159,561 B1
(45) Date of Patent: Jan. 9, 2007

(54) INTERNAL COMBUSTION ENGINE QUICK-STOP

(75) Inventors: James Kerns, Trenton, MI (US); Thomas Rolewicz, Jr., Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/249,842

(22) Filed: Oct. 12, 2005

(51) Int. Cl.
*F02D 1/00* (2006.01)
*F02D 13/04* (2006.01)

(52) U.S. Cl. .............. 123/319; 123/329; 123/406.5

(58) Field of Classification Search ............ 123/319, 123/329, 339.1, 399.11, 339.14, 397, 406.5
See application file for complete search history.

(56) References Cited

U.S. PATENT DOCUMENTS

| | | | | |
|---|---|---|---|---|
| 5,703,410 A | * | 12/1997 | Maekawa | 290/40 C |
| 5,924,395 A | * | 7/1999 | Moriya et al. | 123/90.15 |
| 6,253,866 B1 | * | 7/2001 | Kojima | 180/65.2 |
| 6,467,458 B1 | * | 10/2002 | Suzuki et al. | 123/491 |
| 6,947,830 B1 | * | 9/2005 | Froloff et al. | 701/111 |
| 2003/0145808 A1 | | 8/2003 | Foelsche | |
| 2004/0149251 A1 | | 8/2004 | Nishikawa et al. | |

FOREIGN PATENT DOCUMENTS

| JP | 2004360549 | 12/2004 |
|---|---|---|
| WO | WO 01/48373 | 7/2001 |

* cited by examiner

*Primary Examiner*—John T. Kwon
(74) *Attorney, Agent, or Firm*—Allan J. Lippa; Alleman Hall McCoy Russell & Tuttle LLp

(57) ABSTRACT

A system and method for stopping an internal combustion engine. According to one aspect of the disclosure, a shutdown sequence of the engine includes retarding ignition timing relative to ignition timing prior to initiation of the shutdown sequence, and then advancing ignition timing relative to ignition timing prior to initiation of the shutdown sequence.

10 Claims, 3 Drawing Sheets

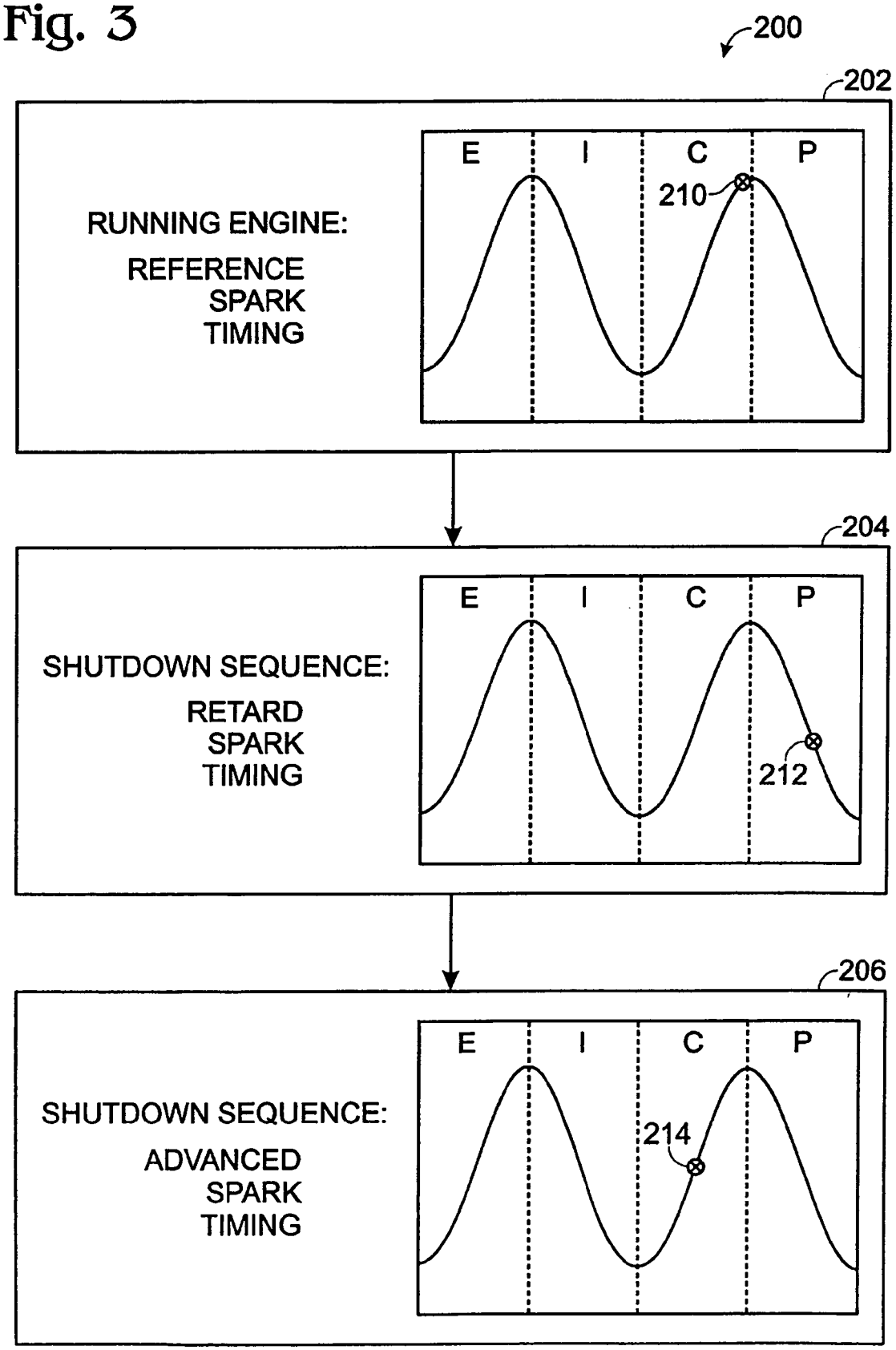

INTERNAL COMBUSTION ENGINE QUICK-STOP

FIELD

The present disclosure is directed toward a system and method for quick-stopping an internal combustion engine.

BACKGROUND AND SUMMARY

Internal combustion engines convert chemical energy in a fuel to mechanical energy. As part of the conversion, an engine may combust fuel and air, generating several products, or emissions. For example, when hydrocarbons are used as fuel, combustion products can include $CO_2$ and $NO_x$.

In an attempt to reduce tailpipe emissions, efforts have been made to utilize catalysts to react with the undesired emissions, thereby releasing alternative substances from the tailpipe. Other attempts have been made to decrease emissions by decreasing the operating time of an engine, for example, by using an electric motor to provide driving power under some driving conditions.

The inventors herein have recognized that several issues are raised by using a catalyst, both with and without an electric motor. In particular, while catalysts can be very effective at converting tailpipe emissions when an engine is operating under normal conditions, catalyst performance can be hindered if an engine pumps oxygen, or another undesired substance, to the catalyst. Such substances can be pumped to a catalyst when an engine is stopping, in particular if combustion has ceased but the pistons are still moving. This can be a particularly pertinent problem with a hybrid electric vehicle, where an engine may frequently stop and start.

At least some of the issues associated with saturating a catalyst with oxygen, or another undesired substance, may be addressed by quick-stopping an engine such that when the engine is stopping, burnt combustion gases are pumped to the catalyst instead of oxygen or other undesired substances. In this way, it may be possible to limit tailpipe emissions and/or improve catalyst performance.

BRIEF DESCRIPTION OF THE DRAWINGS

FIG. 3 shows relative spark timing before initiating a shutdown sequence and during two different phases of a shutdown sequence.

DETAILED DESCRIPTION

The present disclosure relates to a strategy for quick-stopping an internal combustion engine to limit catalyst saturation from undesired substances, such as oxygen. While discussed in the context of a hybrid electric vehicle, the present disclosure is equally applicable to an internal combustion engine used in virtually any other manner.

Figure 1:
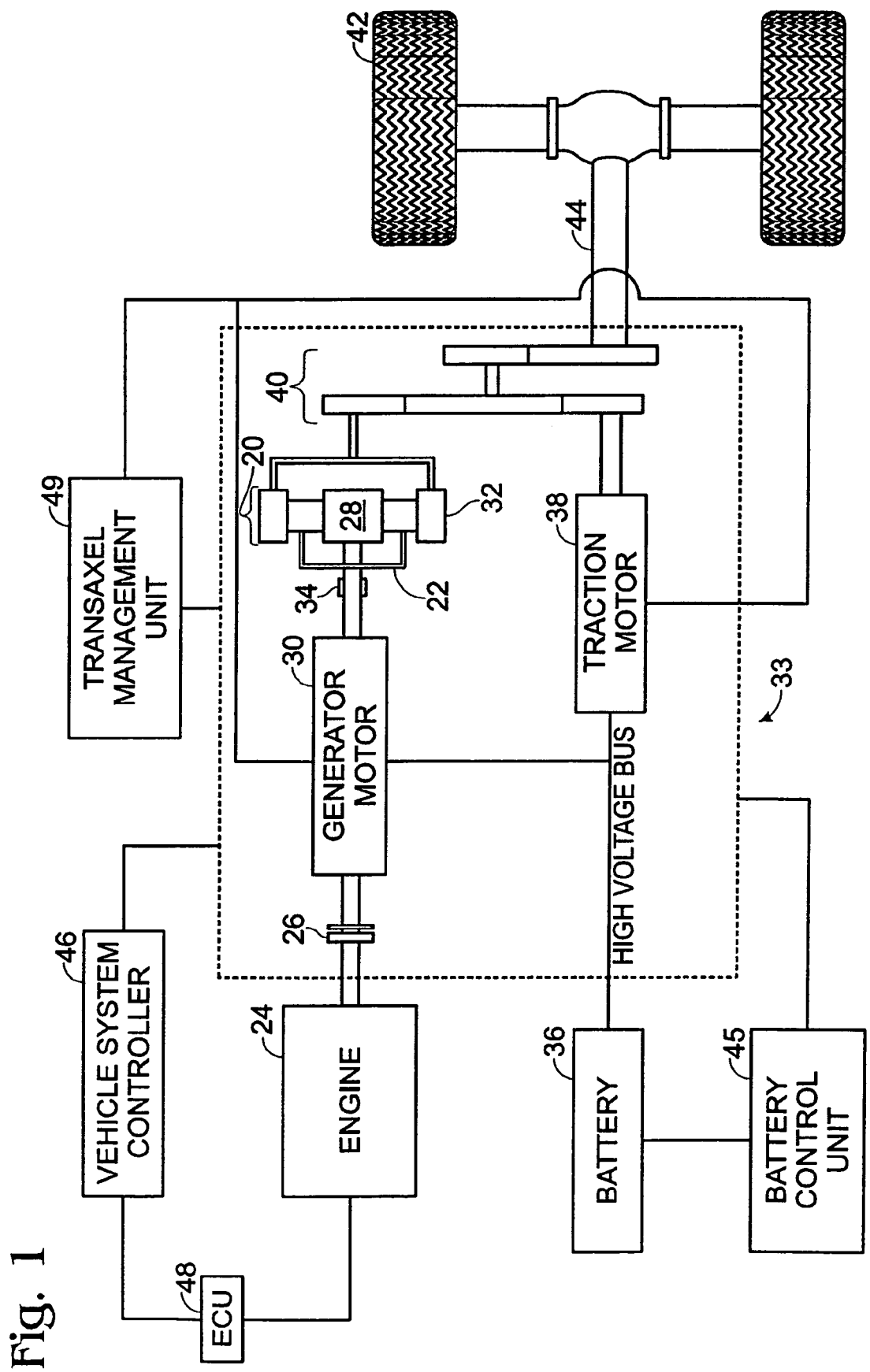
FIG. 1 schematically shows a hybrid electric vehicle including an internal combustion engine.

FIG. 1 somewhat schematically shows a parallel/series (split) configuration hybrid electric vehicle or HEV. In the illustrated HEV, an engine 24 is coupled to a planet carrier 22 of planetary gear set 20. A one way clutch 26 allows forward rotation and prevents backward rotation of the engine and planet carrier. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20 splits the engine output energy into a series path from engine 24 to generator motor 30 and a parallel path from engine 24 to drive wheels 42. Engine speed can be controlled by varying the split to the series path while maintaining the mechanical connection through the parallel path. The traction motor 38 augments engine power to the drive wheels on the parallel path through the second gear set 40. The traction motor 38 also provides the opportunity to use energy directly from the series path, essentially running off power created by the generator motor 30. This reduces losses associated with converting energy into and out of chemical energy in the battery and allows substantially all engine energy, minus conversion losses, to reach drive wheels 42.

Thus, FIG. 1 shows engine 24 attached directly to planet carrier 22, for example without a clutch that can disconnect the engine from the planet carrier. One way clutch 26 allows the shaft to rotate freely in a forward direction, but grounds the shaft to the powertrain's stationary structure when a torque attempts to rotate the shaft backwards. Brake 34 does not interrupt the connection between the sun gear 28 and generator motor 30, but can, when energized, ground the shaft between those two components to the powertrain's stationary structure.

A vehicle system controller (VSC) 46 controls many components in this HEV configuration by connecting to each component's controller. An engine control unit (ECU) 48 can connect to the engine 24 via a hardwire interface. In some embodiments, ECU 48 and VSC 46 can be placed in the same unit and/or serve as the same controller. In some embodiments, ECU 48 and VSC 46 may function as independent controllers, and/or be placed in separate units. The VSC 46 can communicate with the ECU 48, as well as a battery control unit (BCU) 45 and a transaxle management unit (TMU) 49 through a communication network such as a controller area network (CAN) 33. The BCU 45 can connect to battery 36 via a hardwire interface. The TMU 49 controls the generator motor 30 and the traction motor 38 via a hardwire interface. The control units 46, 48, 45 and 49, and CAN 33 can include one or more microprocessors, computers, or central processing units; one or more computer readable storage devices; one or more memory management units; and one or more input/output devices for communicating with various sensors, actuators and control circuits.

Figure 2:
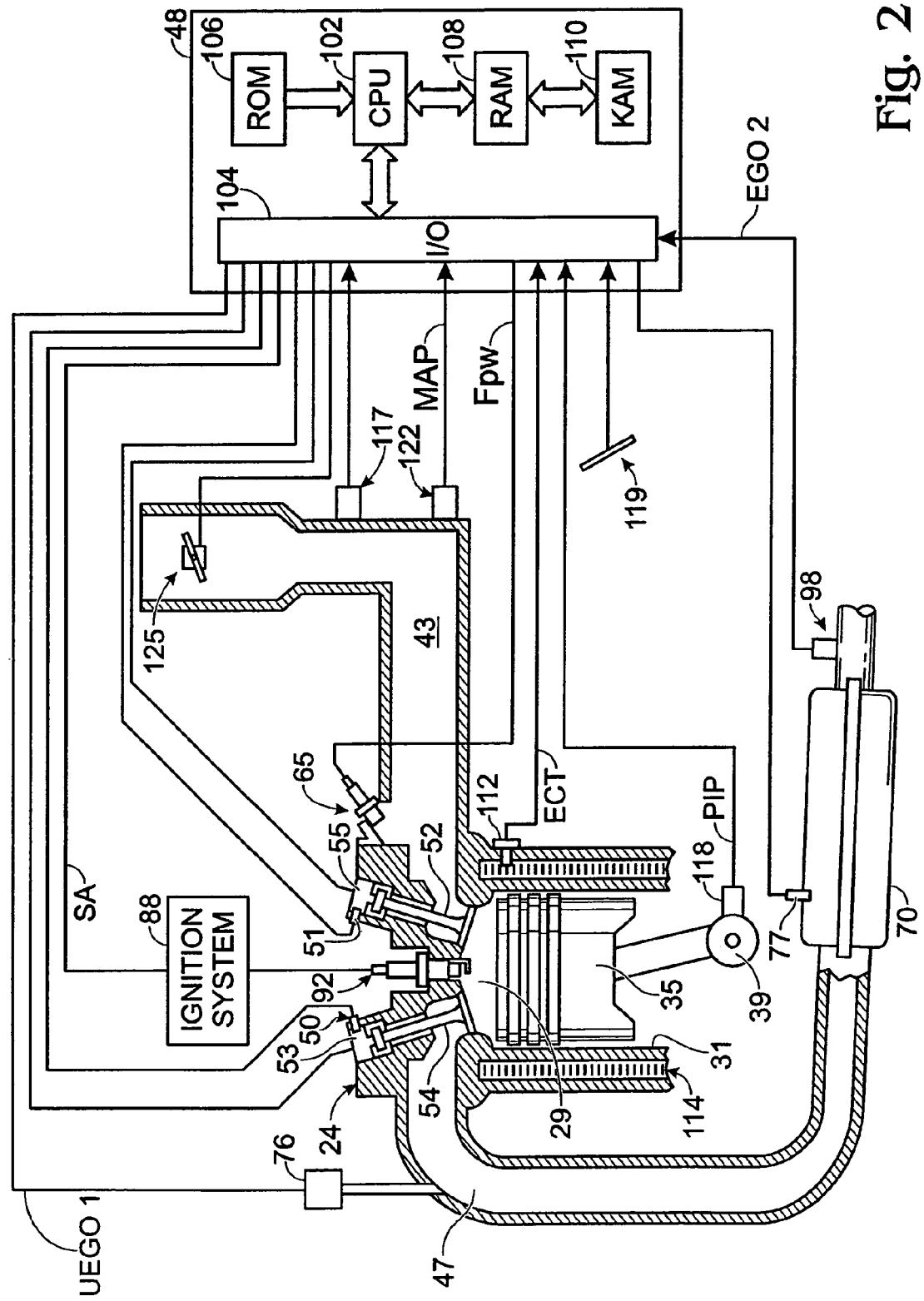
FIG. 2 schematically shows the internal combustion engine of FIG. 1.

FIG. 2 shows an example engine and exhaust system that may be used as engine 24. Though introduced in the context of a split configuration hybrid electric vehicle above, it should be understood that the quick-stop strategy described below with reference to engine 24 can also be applied to an engine used in a differently configured hybrid electric vehicle, a non-hybrid electric vehicle, and/or non-vehicle application.

Internal combustion engine 24 includes a plurality of cylinders, one cylinder of which is shown in FIG. 2. The engine can be controlled by a controller including an electronic engine controller and/or a vehicle system controller. Engine 24 includes combustion chamber 29 and cylinder walls 31, with piston 35 positioned therein and connected to crankshaft 39. Combustion chamber 29 is shown communicating with intake manifold 43 and exhaust manifold 47 via respective intake valve 52 and exhaust valve 54. While only one intake and exhaust valve is shown, more than one may be used if desired.

Variable valve timing may be effectuated by variable cam timing, although this is not required. In some embodiments, independent intake cam timing can be used with independent exhaust cam timing, and in some embodiments, variable intake cam timing may be used with fixed exhaust cam timing, or vice versa. Also, various types of variable valve timing may be used, such as with hydraulic vane-type actuators 53 and 55 receiving respective cam timing control signals VCTE and VCTI from controller 48. Cam timing (exhaust and intake) position feedback can be provided via comparison of the crank signal PIP and signals from respective cam sensors 50 and 51.

In some embodiments, cam actuated exhaust valves may be used with electrically actuated intake valves. In such a case, the controller can determine whether the engine is being stopped or pre-positioned to a condition with the exhaust valve at least partially open, and if so, hold the intake valve(s) closed during at least a portion of the engine stopped duration to reduce communication between the intake and exhaust manifolds.

Intake manifold 43 is also shown having fuel injector 65 coupled thereto for delivering fuel in proportion to the pulse width of signal FPW from controller 48. Fuel is delivered to fuel injector 65 by a fuel system (not shown) which can include a fuel tank, fuel pump, and fuel rail (not shown). In some embodiments, the engine may be configured for direct injection (top or side), where the fuel is injected directly into the engine cylinder. In addition, intake manifold 43 is shown communicating with optional electronic throttle 125.

Distributorless ignition system 88 provides ignition spark to combustion chamber 29 via spark plug 92 in response to a signal received from ECU 48. As described in more detail below, ignition spark timing can be controlled to help limit catalyst saturation during engine shutdown. As used herein, ignition spark time, ignition timing, and/or spark timing refer to the time at which a spark plug for a particular cylinder sparks relative to the position of that cylinder's piston, generally near the end of the compression stroke (although spark can be retarded into the power stroke).

Universal Exhaust Gas Oxygen (UEGO) sensor 76 is shown coupled to exhaust manifold 47 upstream of catalytic converter 70. Alternatively, a two-state exhaust gas oxygen sensor may be substituted for UEGO sensor 76. Two-state exhaust gas oxygen sensor 98 is shown coupled to the exhaust system downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in some embodiments. In some embodiments, multiple emission control devices, each which can have multiple bricks, can be used. Converter 70 can be a three-way type catalyst in some embodiments.

A controller including ECU 48 is shown in FIG. 2. ECU 48 includes a microprocessor unit 102, input/output ports 104, read-only memory 106, random access memory 108, keep alive memory 110, and a data bus. ECU 48 is shown receiving various signals from sensors coupled to engine 24, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In one aspect of the present description, engine position sensor 118 produces a predetermined number of equally spaced pulses every revolution of the crankshaft from which engine speed (RPM) can be determined.

ECU 48 can control ignition timing of engine 24 while the engine is running. It should be understood that ECU 48 can also control many other aspects of engine operation, although such control need not be extensively described in order to teach the spark timing used to quick-stop the engine. In general, ECU 48 can control ignition timing (and other aspects of engine operation) so that engine 24 produces a desired torque while running. In many operating conditions, the ECU can set spark timing to occur at various times during the power stroke of a four stroke engine. Nonlimiting examples of such timing can include, but are not limited to, at top dead center (TDC), 5 degrees after TDC, 10 degrees after TDC, 15 degrees after TDC, etc. While the engine is running, adjustments can be continuously made to the spark timing.

Various conditions may arise in which it is desirable to shut down engine 24. For example, the vehicle may be completely turned off and parked. As another example, an electric motor of an HEV may be capable of delivering all the power necessary to drive the HEV, thus enabling the internal combustion engine to be shut down. While an engine can be shut down simply by ceasing fuel injection and/or sparking all together, such a technique will not cause the engine to immediately stop moving. The pistons will continue to pump as the engine coasts down. If there are no combustion events, and the pistons are still pumping, air will be forced through the exhaust system, including the catalyst. The catalyst can become saturated with oxygen, or another undesired substance, under such circumstances. As a result, the catalyst will be less efficient at reducing $NO_x$. Also, the excess air can tend to cool the catalyst, and the intake manifold fuel puddles can be depleted.

In some embodiments, this problem can be addressed by limiting (or even eliminating) the number of engine cycles that occur without a combustion event. Instead of simply stopping fuel injection and/or spark so that no combustion event occurs, a shutdown sequence can be initiated in which the engine is stopped.

A shutdown sequence can include a first phase in which the engine speed is slowed. In order to slow the engine speed, the spark can be retarded to occur relatively late during the power stroke, so as to generate less than optimal power output from the combustion event. In some embodiments, the spark can be severely retarded to occur very late in the power stroke. Such a delayed spark can help slow the engine while combustion gases, as opposed to fresh air, are delivered to the catalyst.

The spark can be delayed for any number of engine cycles. In some embodiments, the spark can be delayed in two or more cylinders. Furthermore, the spark can be delayed by the same amount for two or more different combustion events, or the relative amount of delay can change from one combustion event to the other. In some embodiments, the spark is progressively delayed in one or more cylinders for one or more engine cycles.

In some embodiments, additional and/or alternative mechanisms can be used to slow the engine. For example, an electric motor and generator assembly can be used to slow an engine in a HEV, while at the same time storing energy that can be used by the vehicle.

After the spark is first retarded to allow the engine to slow, the shutdown sequence can enter a second phase in which the spark is advanced into the compression stroke. In some embodiments, the spark can be advanced to occur early in the compression stroke. A premature ignition can cause the engine to slow as pressure builds on the compression stroke. By causing a combustion event to occur during the compression stroke, the engine can be rapidly stopped. In some embodiments, spark is not advanced into the compression stroke until the engine speed has slowed, during the spark retarding phase of the shutdown sequence, sufficiently so that the engine can be stopped on the first early ignition event. Even if the engine fails to stop on the first early ignition event, the net torque will be nearly zero, and the engine will continue to decelerate and stop on a subsequent compression stroke. In some embodiments, an advanced spark can be used in two or more cylinders and/or for two or more engine cycles.

Using the above described shutdown sequence, the engine can be stopped while the catalyst and the rest of the exhaust system contain substantially only burned exhaust gases and the cylinders contain either exhaust gases or a combustible unburned mixture. On the following restart, the ignition can be triggered for each cylinder at the normal times as the engine starts to rotate. This quick stop and restart procedure can help avoid the over saturation of the catalyst with oxygen and the subsequent loss of $NO_x$ treatment efficiency.

FIG. 3 shows a flow chart 200 that demonstrates how the spark timing can be changed during an engine shutdown sequence. At 202, a reference spark timing 210 that corresponds to a running engine is shown. It should be understood that the precise spark timing can change substantially throughout engine operation, and the illustrated spark timing is meant only to provide a reference to which spark timing during engine shutdown can be compared. The actual spark timing while an engine is running can be more advanced or retarded than shown.

As shown at 204, spark timing 212 can be retarded (made to occur later in the power stroke) when an engine shutdown sequence is initiated. The amount of ignition delay can be set to provide a desired magnitude of engine deceleration. In some embodiments, increased ignition delay can correspond to increased engine deceleration. The illustrated spark timing is not limiting, but rather illustrates one possible spark timing that is retarded relative to spark timing 210.

As shown at 206, spark timing 214 can be advanced (made to occur sooner in the power stroke or in the compression stroke) to further advance the engine shutdown sequence. Again, the illustrated spark timing is not limiting, but rather illustrates one possible spark timing that is advanced relative to spark timings 210 and 212. The spark advance can be set to begin when engine speed is sufficiently decelerated so that a limited number of advanced spark combustion events can bring the engine to a complete stop.

The invention claimed is:

1. A method of stopping an internal combustion engine, comprising:
running the internal combustion engine; and then
initiating a shutdown sequence for the internal combustion engine, the shutdown sequence including:
retarding ignition timing relative to ignition timing prior to initiation of the shutdown sequence; and then
advancing ignition timing relative to ignition timing prior to initiation of the shutdown sequence.

2. The method of claim 1, wherein advancing ignition timing includes advancing ignition timing into the compression stroke of at least one cylinder for at least one engine cycle.

3. The method of claim 1, wherein ignition continues according to the shutdown sequence until the internal combustion engine stops.

4. The method of claim 1, wherein a combustible air and fuel mixture is held in at least one cylinder after the engine stops.

5. The method of claim 1, wherein before the engine stops every completed engine cycle for every cylinder includes a combustion event.

6. The method of claim 1, further comprising using an electric motor and generator assembly to decelerate the internal combustion engine during the shutdown sequence.

7. A hybrid electric vehicle, comprising:
a drivetrain;
an engine with a plurality of cylinders configured to deliver power to the drivetrain under at least some conditions;
an electric motor and generator assembly configured to deliver power to the drivetrain under at least some conditions and configured to receive power from the drivetrain under at least some conditions; and
a controller for periodically stopping the engine by initiating a shutdown sequence in which ignition timing is first retarded relative to ignition timing prior to initiation of the shutdown sequence, and then ignition timing is advanced relative to ignition timing prior to initiation of the shutdown sequence.

8. The hybrid electric vehicle of claim 7, wherein the electric motor and generator assembly decelerates the engine during the shutdown sequence.

9. The hybrid electric vehicle of claim 7, wherein ignition timing is advanced into the compression stroke of at least one cylinder for at least one engine cycle.

10. The hybrid electric vehicle of claim 7, wherein the controller maintains at least one combustion event during every completed engine cycle until the engine is stopped.

* * * * *